(12) United States Patent
Kobayashi

(10) Patent No.: US 9,112,442 B2
(45) Date of Patent: *Aug. 18, 2015

(54) VOLTAGE CONVERSION CONTROL DEVICE FOR MOTOR

(75) Inventor: Masashi Kobayashi, Gotenba (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 142 days.

This patent is subject to a terminal disclaimer.

(21) Appl. No.: 13/991,643

(22) PCT Filed: Dec. 8, 2010

(86) PCT No.: PCT/JP2010/072045
§ 371 (c)(1),
(2), (4) Date: Jun. 5, 2013

(87) PCT Pub. No.: WO2012/077203
PCT Pub. Date: Jun. 14, 2012

(65) Prior Publication Data
US 2013/0249451 A1  Sep. 26, 2013

(51) Int. Cl.
*H02P 5/68* (2006.01)
*H02P 5/74* (2006.01)
(Continued)

(52) U.S. Cl.
CPC . *H02P 5/68* (2013.01); *B60L 15/06* (2013.01); *H02P 5/74* (2013.01); *H02P 23/009* (2013.01);
(Continued)

(58) Field of Classification Search
CPC ....... H02P 6/001; H02K 29/12; B62D 5/0463
USPC .......................... 318/400.3, 432, 400.39, 268
See application file for complete search history.

(56) References Cited

U.S. PATENT DOCUMENTS 8,467,199 B2   6/2013   Lee et al.
2006/0055349 A1   3/2006   Nakayama et al.
(Continued)

FOREIGN PATENT DOCUMENTS

CN   1757155   4/2006
CN   101743521   6/2010
(Continued)

OTHER PUBLICATIONS

Office Action for U.S. Appl. No. 13/380,166 mailed Apr. 10, 2014.
(Continued)

*Primary Examiner* — Karen Masih
(74) *Attorney, Agent, or Firm* — Finnegan, Henderson, Farabow, Garrett & Dunner, LLP

(57) ABSTRACT

Disclosed is a control device which performs voltage conversion control for a voltage conversion circuit between motor control circuits which control a plurality of motors and a power supply. The control device includes sampling means for sampling a DC voltage after voltage conversion, target voltage setting means for setting target voltages of the plurality of motors, selection means for selecting a target voltage to be converted by the voltage conversion circuit from among the plurality of target voltages, generation means for generating a sampling timing on the basis of a carrier signal of one of the motors having the unselected target voltage, and control means for performing voltage conversion control using the DC voltage sampled by the sampling means in response to the sampling timing for each sampling timing request of voltage conversion control.

4 Claims, 8 Drawing Sheets

(51) Int. Cl.
*B60L 15/06* (2006.01)
*H02P 23/00* (2006.01)

(52) U.S. Cl.
CPC ......... *B60L 2210/14* (2013.01); *H02P 2201/09* (2013.01); *Y02T 10/644* (2013.01); *Y02T 10/648* (2013.01); *Y02T 10/7225* (2013.01)

(56) References Cited

U.S. PATENT DOCUMENTS

| | | |
|---|---|---|
| 2007/0216323 A1 | 9/2007 | Ishikawa et al. |
| 2007/0290633 A1 | 12/2007 | Atarashi et al. |
| 2010/0141198 A1 | 6/2010 | Krah |
| 2011/0307136 A1 | 12/2011 | Komata et al. |
| 2012/0249001 A1* | 10/2012 | Okubo et al. ............. 315/200 R |
| 2013/0249451 A1 | 9/2013 | Kobayashi |

FOREIGN PATENT DOCUMENTS

| | | |
|---|---|---|
| CN | 103250342 | 8/2013 |
| DE | 10 2007 025210 | 12/2007 |
| JP | 2005-341698 | 12/2005 |
| JP | 2007-236100 | 9/2007 |
| JP | 2009-112164 | 5/2009 |
| JP | 2009-201195 | 9/2009 |
| JP | 2010-29023 | 2/2010 |
| WO | WO 03/015254 | 2/2003 |

OTHER PUBLICATIONS

U.S. Appl. No. 13/380,166, filed Dec. 22, 2011 (available in PAIR).

Notice of Allowance and Fee(s) Due and Notice of Allowability for U.S. Appl. No. 13/380,166 dated Oct. 30, 2014.

* cited by examiner

US 9,112,442 B2

VOLTAGE CONVERSION CONTROL DEVICE FOR MOTOR

CROSS-REFERENCE TO RELATED APPLICATIONS

This application is a national phase application of International Application No. PCT/JP2010/072045, filed Dec. 8, 2010, the content of which is incorporated herein by reference.

TECHNICAL FIELD

The present invention relates to a voltage conversion control device for a motor which performs voltage conversion control on a voltage conversion circuit between a motor control circuit controlling a plurality of motors and a power supply configured to convert a DC voltage of the power supply to an input DC voltage necessary for driving the motor.

BACKGROUND ART

In recent years, a hybrid vehicle, an electric vehicle, and the like with environmental consideration have been developed, and these vehicles include a motor as a driving source. Of these vehicles, there is a vehicle which includes a plurality of motors (including motor generators or generators). An AC motor is used as the motor, DC power is converted to three-phase AC power by an inverter, and the motor is driven with three-phase AC power. Since a high voltage is needed so as to output high rotation or high torque with the motor, a DC voltage of a battery is boosted to a DC high voltage by a voltage boost converter, and the DC high voltage is supplied to the inverter. For this reason, in a vehicle, in order to control the motor, inverter control for controlling switching of a switching element of the inverter and voltage boost control for controlling switching of a switching element of the voltage boost converter are performed. A smoothing capacitor is provided between the voltage boost converter and the inverter, and a voltage (a DC high voltage after boosting by the voltage boost converter) across both ends of the smoothing capacitor is detected by a voltage sensor. In the voltage boost control, control is performed such that a target voltage necessary for driving the motor is reached using the DC high voltage detected by the voltage sensor. In particular, in a case of a system which includes a plurality of motors, a target voltage necessary for driving each motor is set, and a target voltage of the system is selected from among the plurality of target voltages.

Patent Literature 1 describes a control device for a vehicle which includes two motor generators. In this control device, a gate signal for controlling a switching element of a voltage boost converter is generated on the basis of a sensor value of a voltage of a DC power supply, a sensor value of a voltage across both ends of a smoothing capacitor, a motor torque command value of each motor generator, and a motor rotation speed, and a gate signal for controlling a switching element of an inverter is generated on the basis of a sensor value across both ends of the smoothing capacitor, a motor torque command value, and a sensor value of a motor current for each motor generator.

CITATION LIST

Patent Literature

[Patent Literature 1] Japanese Unexamined Patent Application Publication No. 2009-201195

SUMMARY OF INVENTION

Technical Problem

Since low-cost or reduction in size is needed in vehicle development, reduction in the capacitance of the smoothing capacitor between the voltage boost converter and the inverter is needed. As the capacitance of the smoothing capacitor is reduced, the ratio of transfer of electric charges to the smoothing capacitor based on switching of the switching element of the inverter increases. For this reason, if the smoothing ability of the smoothing capacitor is not enough, the voltage across both ends of the smoothing capacitor fluctuates largely, and pulsation occurs in the DC high voltage after boosting.

Specifically, if a carrier frequency (a switching frequency for turning on/off the switching element of the inverter) of inverter control is lowered temporarily due to restrictions on the traveling state (for example, when the temperature of the switching element of the inverter is high) or the like, the period in which the switching element is turned on/off is extended, and switching noise of the inverter control is superimposed on the voltage (the DC high voltage after boosting) across both ends of the smoothing capacitor as a large fluctuation (pulsation component). FIG. 7 shows a temporal change $VH_{2.5}$ in the DC high voltage when the carrier frequency is 2.5 kHz and a temporal change $VH_{1.25}$ in the DC high voltage when the carrier frequency is 1.25 kHz. A curve represented by reference numeral $VH_F$ is a temporal change in a filter value which is obtained by filtering the temporal changes $VH_{2.5}$ and $VH_{1.25}$ in the DC high voltage with a predetermined time constant. As will be understood from FIG. 7, the DC high voltage after boosting has a large pulsation component superimposed thereon when the carrier frequency is low rather than when the carrier frequency is high, and fluctuates largely. Incidentally, while a current pulsation component of the motor becomes small as the carrier frequency is high, system loss increases with an increase in heat generation of the switching element.

The target voltage necessary for driving the motor changes depending on a motor rotation speed or torque. If the target voltage is high, and the DC high voltage after boosting becomes higher than a motor induced voltage, a pulsation component is superimposed on the DC high voltage in accordance with the voltage difference.

FIG. 8(a) shows the relationship between a voltage $VH_H$ when the DC high voltage is high and a voltage $VH_L$ when the DC high voltage is low, and a motor induced voltage Vemf. When comparing the voltage differences $Vdef_{H1}$ and $Vdef_{H2}$ between the DC high voltage $VH_H$ when the DC high voltage is high and the motor induced voltage Vemf with the voltage differences $Vdef_{L1}$ and $Vdef_{L2}$ between the DC high voltage $VH_L$ when the DC high voltage is low and the motor induced voltage Vemf, the voltage difference Vdef becomes larger in the case of the DC high voltage $VH_H$ when the DC high voltage is high. As the voltage difference Vdef increases, a fluctuation which is superimposed on a motor current increases.

FIG. 8(b) shows a carrier signal SC and a duty signal SD in the inverter control, and a gate signal for turning on/off the switching element of the inverter is generated in accordance with an intersection point of the carrier signal SC and the duty signal SD. FIG. 8(c) shows a target current $MI_T$ of a motor, an actual current $MI_H$ of a motor in a case of the large voltage difference $Vdef_H$, and an actual current $MI_L$ of the motor in a case of the small voltage difference $Vdef_L$. The actual currents $MI_H$ and $MI_L$ of the motor fluctuate with respect to the target current $MI_T$, and a pulsation component by the effect of switching of the switching element of the inverter is superimposed, and as will be understood from FIGS. 8(b) and 8(c), an increase/decrease in the pulsation component changes at the intersection point of the carrier signal SC and the duty signal SD. As will be understood from FIG. 8(c), the larger the voltage difference Vdef, the larger the pulsation component is superimposed on the motor current. FIG. 8(d) shows the DC high voltage VH after boosting in a case of the actual current $MI_H$ of the motor when the voltage difference is the large voltage difference $Vdef_H$. The DC high voltage VH is pulsed in accordance with the pulsation of the actual current of the motor, and fluctuates largely.

That is, the pulsation component which is superimposed on the motor current by the effect of switching in the inverter control is determined by the voltage difference Vdef between the DC high voltage VH and the motor induced voltage Vemf, and the carrier frequency of the inverter control. For this reason, if an inverter frequency is lowered when the voltage difference Vdef is large, the pulsation component which is superimposed on the motor current increases. When the capacitance of the smoothing capacitor is small, if the pulsation component which is superimposed on the motor current increases, the smoothing ability of the smoothing capacitor is not enough, the voltage across both ends of the smoothing capacitor fluctuates largely, and pulsation occurs in the DC high voltage after boosting.

FIG. 8(d) shows an expected value (an intermediate value between a crest and a trough of the DC high voltage VH, and a DC high voltage including no pulsation component) $VH_E$ of the DC high voltage and sampling timing request signals $DS_1$, $DS_2$, and $DS_3$ of a DC high voltage in voltage boost control together with an actual DC high voltage VH. The sampling timing request signals $DS_1$, $DS_2$, and $DS_3$ are output in each sampling timing period PS. In the voltage boost control of the related art, if the sampling timing request signals $DS_1$, $DS_2$, and $DS_3$ are output, the voltage across both ends of the smoothing capacitor is detected by the voltage sensor, and control is performed such that the target voltage is reached using the detected DC high voltages $VH_1$, $VH_2$, and $VH_3$. However, for example, in a case of the DC high voltage $VH_1$ detected with the sampling timing request signal $DS_1$, a large pulsation component is added by the effect of the pulsation component of the motor current due to switching noise on the inverter control side, and is largely deviated from the expected value $VH_{E1}$ of the DC high voltage. When the voltage boost control is performed using the DC high voltage $VH_1$, the voltage boost control becomes unstable.

In the control described in Patent Literature 1, the gate signal for controlling the switching element of the voltage boost converter and the gate signal for controlling the switching element of the inverter of each motor generator are separately generated, and the voltage boost control and the inverter control do not cooperate with each other. For this reason, when pulsation occurs in the DC high voltage after boosting in the voltage boost converter, this pulsation component is included in the sensor value of the voltage across both ends of the smoothing capacitor for use in the voltage boost control, and the voltage boost control becomes unstable.

In particular, in a system including a plurality of motors, a different target voltage is required for each motor, in the normal control, a highest target voltage from among a plurality of target voltages is selected as the target voltage of the system, and in the voltage boost control, the DC high voltage is controlled so as to become the highest target voltage. For this reason, in a motor having a low target voltage not selected as the target voltage of the system, since the voltage difference Vdef between the DC high voltage VH and the motor induced voltage Vemf becomes larger, the pulsation component which is superimposed on the motor current increases.

Accordingly, an object of the invention is to provide a voltage conversion control device for a motor which performs stable voltage conversion control even when there is pulsation in an input DC voltage of a motor caused by the pulsation of a motor current in a system including a plurality of motors.

Solution to Problem

According to the invention, there is provided a voltage conversion control device for a motor which performs voltage conversion control on a voltage conversion circuit provided between a motor control circuit controlling a plurality of motors and a power supply, the voltage conversion circuit configured to convert a DC voltage of the power supply to an input DC voltage necessary for driving the motor. The voltage conversion control device includes sampling means for detecting a voltage across both ends a capacitor provided between the motor control circuit and the voltage conversion circuit and sampling the input DC voltage converted by the voltage conversion circuit, target voltage setting means for setting a target voltage of the input DC voltage for each motor, selection means for selecting a target voltage to be converted by the voltage conversion circuit from among a plurality of target voltages set by the target voltage setting means, sampling timing generation means for generating a sampling timing of sampling the input DC voltage converted by the voltage conversion circuit on the basis of a carrier signal of motor control on one of the motors having the target voltages not selected by the selection means, and control means for performing voltage conversion control using the input DC voltage sampled by the sampling means in accordance with the sampling timing generated by the sampling timing generation means for each sampling timing request of the voltage conversion control.

This voltage conversion control device for a motor is a device which performs voltage conversion control on a voltage conversion circuit in a multi-motor system including a plurality of motors, a motor control circuit, a voltage conversion circuit, a power supply, and the like. A capacitor is provided between the motor control circuit and the voltage conversion circuit, and the voltage across both ends of the capacitor is detected and the input DC voltage converted by the voltage conversion circuit is sampled by the sampling means. In the voltage conversion control device for a motor, a target voltage of the input DC voltage necessary for driving the motor for each motor is set by the target voltage setting means, and a target voltage to be converted by the voltage conversion circuit is selected from among the target voltages of the respective motors by the selection means. In the voltage conversion control device for a motor, control is performed using the input DC voltage sampled by the sampling means such that the input DC voltage becomes the target voltage selected by the selection means. The motor includes a motor generator or a generator having a power generation function as well as a motor having a driving function.

The pulsation of the input DC voltage of the motor is caused by the pulsation of a motor current. A pulsation component which is superimposed on the motor current is the effect of switching of motor control, and is determined by a carrier signal (a carrier signal which is a signal generated on the motor control side and controls switching of a switching element of the motor control circuit) on the motor control side and the voltage difference between the input DC voltage of the motor and a motor induced voltage. For this reason, an intermediate value between a crest and a trough of the motor current having the pulsation component superimposed thereon is in the proximity of the crest or trough (apex portion) of the carrier signal. Accordingly, an intermediate value (that is, an input DC voltage with a pulsation component removed and an expected value of the input DC voltage for stably performing the voltage conversion control) between the crest and the trough of the input DC voltage having a pulsation component superimposed thereon is also obtained at the timing in the proximity of the crest or trough of the carrier signal. In a case of a system including a plurality of motors, as described above, the target voltage of the input DC voltage is set for each motor, and one target voltage is selected as a target voltage of the system from among the target voltages of the respective motors. For this reason, in the motors having the unselected target voltages, the voltage difference between the input DC voltage and the motor induced voltage becomes larger compared to the motor having the target voltage selected as the target voltage of the system, and the pulsation component which is superimposed on the motor current increases.

Accordingly, in the voltage conversion control device for a motor, the sampling timing of sampling the input DC voltage is generated by the sampling timing generation means on the basis of the carrier signal of the motor control for one motor from among the motors having the target voltages not selected by the selection means. When the number of motors having the target voltage not selected by the selection means is one, the carrier signal of one motor is used, and when the number of motors having the target voltages not selected by the selection means is in multiples, for example, the carrier signal of a motor which affects the pulsation component of the motor current the most is selected from among the carrier signals of the plurality of motors. In the voltage conversion control device for a motor, control is performed by the control means such that, for each sampling timing request (a timing at which the input DC voltage is output at a necessary timing in the voltage conversion control, and not synchronized with the carrier signal on the motor control side) on the input DC voltage in the voltage conversion control, the target voltage of the system is reached using the input DC voltage (actual voltage) sampled by the sampling means in accordance with the sampling timing generated by the sampling timing generation means. In this way, in the voltage conversion control device for a motor, the input DC voltage which is used in the voltage conversion control is sampled taking into consideration the carrier signals of the motors having the target voltages not selected as the target voltage of the input DC voltage to be converted by the voltage conversion circuit, whereby the input DC voltage close to the expected value of the input DC voltage at the moment of the sampling timing request can be sampled even when there is pulsation in the input DC voltage of the motor. For this reason, the difference between the expected value of the input DC voltage and a sampling value which is actually used in the voltage conversion control decreases, and stable voltage conversion control can be performed. Therefore, it is possible to reduce the capacitance of the capacitor, and to achieve low-cost and reduction in size of the multi-motor system.

In the voltage conversion control device for a motor of the invention, it is preferable that the sampling timing generation means generates a sampling timing in response to a crest and a trough of the carrier signal, each time the sampling timing is generated, the input DC voltage converted by the voltage conversion circuit is sampled by the sampling means, and for each sampling timing request, the control means performs the voltage conversion control using the input DC voltage sampled in accordance with the sampling timing immediately before the sampling timing request.

In the voltage conversion control device for a motor, the sampling timing is generated in response to the crest and the trough of the carrier signal by the sampling timing generation means, and the input DC voltage converted by the voltage conversion circuit is sampled by the sampling means at each sampling timing. The input DC voltage sampled at the timing of the crest and the trough of the carrier signal is an intermediate value or substantially an intermediate value between the crest and the trough of the input DC voltage. In the voltage conversion control device for a motor, control is performed by the control means such that, for each sampling timing request, the target voltage is reached using the input DC voltage (actual voltage) sampled by the sampling means in accordance with the sampling timing immediately before the sampling timing request. The input DC voltage sampled at the timing of the crest or trough of the carrier signal immediately before the sampling timing request is a voltage close to the expected value of the input DC voltage at the moment of the sampling timing request. In this way, in the voltage conversion control device for a motor, the input DC voltage is sampled at the timing of the crest and the trough of the carrier signal of the motor control, whereby the voltage conversion control is possible using the input DC voltage close to the expected value of the input DC voltage at the moment of the sampling timing request even when there is pulsation in the input DC voltage of the motor, and stable voltage conversion control can be performed.

In the voltage conversion control device for a motor of the invention, it is preferable that, for each sampling timing request, the sampling timing generation means generates a sampling timing in response to a crest or trough of the carrier signal immediately after the sampling timing request, the sampling means samples an input DC voltage converted by the voltage conversion circuit in response to the sampling timing, and the control means performs voltage conversion control using the input DC voltage sampled in response to the sampling timing for each sampling timing request.

In the voltage conversion control device for a motor, for each sampling timing request, the sampling timing is generated by the sampling timing generation means in response to the timing of the crest or trough of the carrier signal immediately after the sampling timing request, and the input DC voltage converted by the voltage conversion circuit is sampled by the sampling means in accordance with the sampling timing. The input DC voltage sampled at the timing of the crest or trough of the carrier signal immediately after the sampling timing request is a voltage close to the expected value of the input DC voltage at the moment of the sampling timing request. Accordingly, in the voltage conversion control device for a motor, control is performed by the control means such that the target voltage is reached using the input DC voltage (actual voltage) sampled by the sampling means in accordance with the sampling timing for each sampling timing request. In this way, in the voltage conversion control device for a motor, the input DC voltage is sampled at the timing of the crest or trough of the carrier signal of the motor control immediately after the sampling timing request, whereby the voltage conversion control is possible using the input DC voltage close to the expected value of the input DC voltage at the moment of the sampling timing request even when there is pulsation in the input DC voltage of the motor, and stable voltage conversion control can be performed.

In the voltage conversion control device for a motor of the invention, the plurality of motors are two motors, the target voltage setting means sets the target voltages of the two motors, the selection means selects a target voltage to be converted by the voltage conversion circuit from among the target voltages of the two motors set by the target voltage setting means, and the sampling timing generation means generates a sampling timing for sampling an input DC voltage converted by the voltage conversion circuit on the basis of a carrier signal of the motor having the target voltage not selected by the selection means.

Advantageous Effects of Invention

According to the invention, the input DC voltage which is used in the voltage conversion control is sampled taking into consideration of the carrier signals of the motors having the target voltages not selected as the target voltage of the input DC voltage to be converted by the voltage conversion circuit, whereby the input DC voltage close to the expected value of the input DC voltage at the moment of the sampling timing request can be sampled even when there is pulsation in the input DC voltage of the motor. For this reason, the difference between the expected value of the input DC voltage and the sampling value which is actually used in the voltage conversion control decreases, and stable voltage conversion control can be performed.

BRIEF DESCRIPTION OF DRAWINGS

FIG. 3(a) shows the flow of a determination method, and FIG. 3(b) shows an example of a map of a system voltage and system loss for two motors.

FIG. 4(a) is a relationship diagram between high and low DC high voltages and a motor induced voltage, FIG. 4(b) shows a carrier signal and a duty signal in inverter control, FIG. 4(c) shows a motor target current and a motor actual current, and FIG. 4(d) shows a DC high voltage and a sampling timing request signal.

FIG. 6(a) is a relationship diagram between high and low DC high voltages and a motor induced voltage, FIG. 6(b) shows a carrier signal and a duty signal in inverter control, FIG. 6(c) shows a motor target current and a motor actual current, and FIG. 6(d) shows a DC high voltage and a sampling timing request signal.

FIG. 8(a) is a relationship diagram between high and low DC high voltages and a motor induced voltage, FIG. 8(b) shows a carrier signal and a duty signal in inverter control, FIG. 8(c) shows a motor target current and a motor actual current, and FIG. 8(d) shows a DC high voltage and a sampling timing request signal.

DESCRIPTION OF EMBODIMENTS

Figure 1:
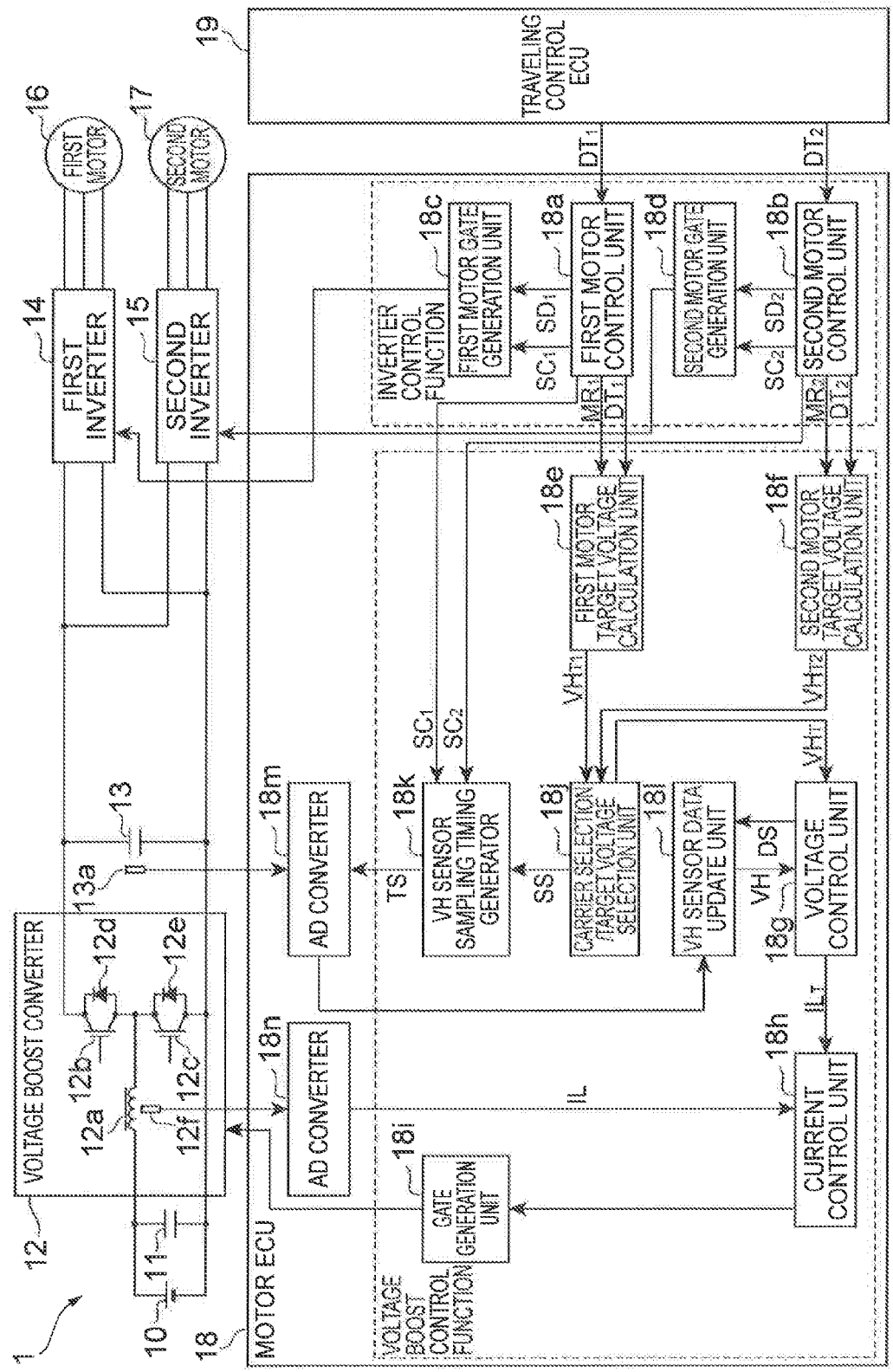
FIG. 1 is a block diagram showing the configuration of a two-motor system according to a first embodiment.

Hereinafter, an embodiment of a voltage conversion control device for a motor according to the invention will be described referring to the drawings. In the drawings, the same or similar elements are represented by the same reference numerals, and overlapping description will not be repeated.

In this embodiment, the voltage conversion control device for a motor according to the invention is applied to a voltage boost control function in a motor ECU [Electronic Control Unit] of a two-motor system vehicle (for example, a hybrid vehicle, an electric vehicle, or a fuel-cell vehicle) having two motors. In a two-motor system according to this embodiment, a DC voltage of a battery is boosted by a voltage boost converter and converted to a DC high voltage necessary for driving a motor, DC power is converted to three-phase AC power of each motor by an inverter of each motor to which the DC high voltage is supplied, and each motor is driven with three-phase AC power. In this embodiment, there are two forms in which a method of setting a sampling timing of a DC high voltage after boosting is different.

Figure 2:
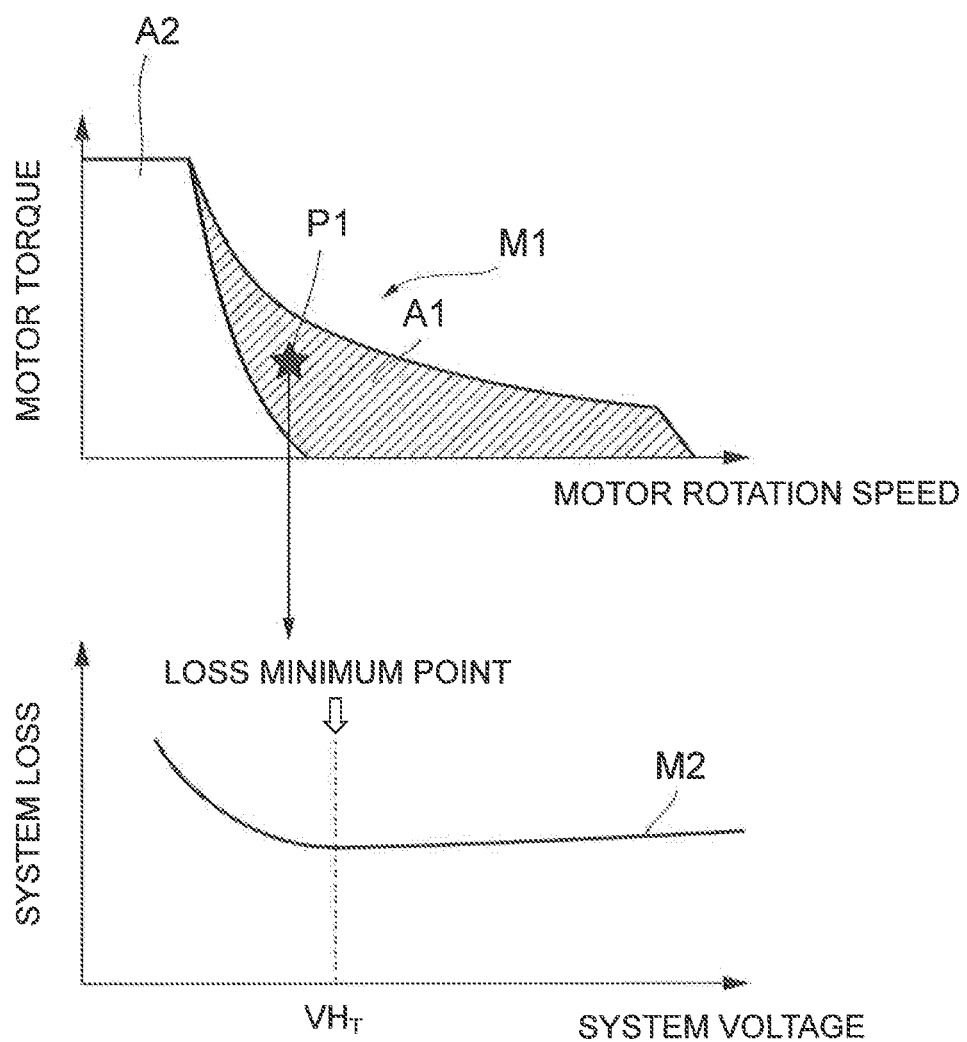
FIG. 2 is an explanatory view of a method of calculating a target voltage of each motor.
Figure 3:
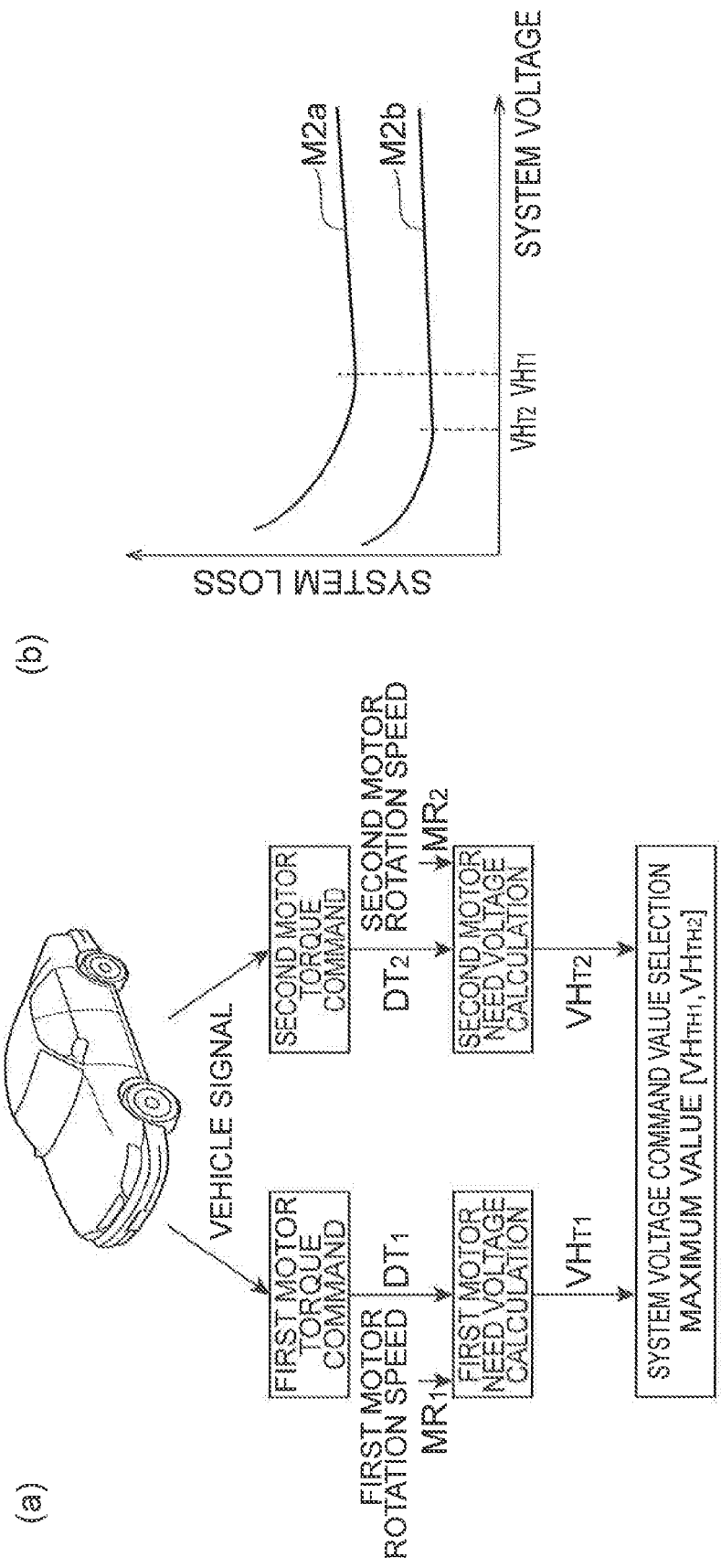
FIG. 3 is an explanatory view of a method of determining a target voltage in a two-motor system, and specifically.
Figure 4:
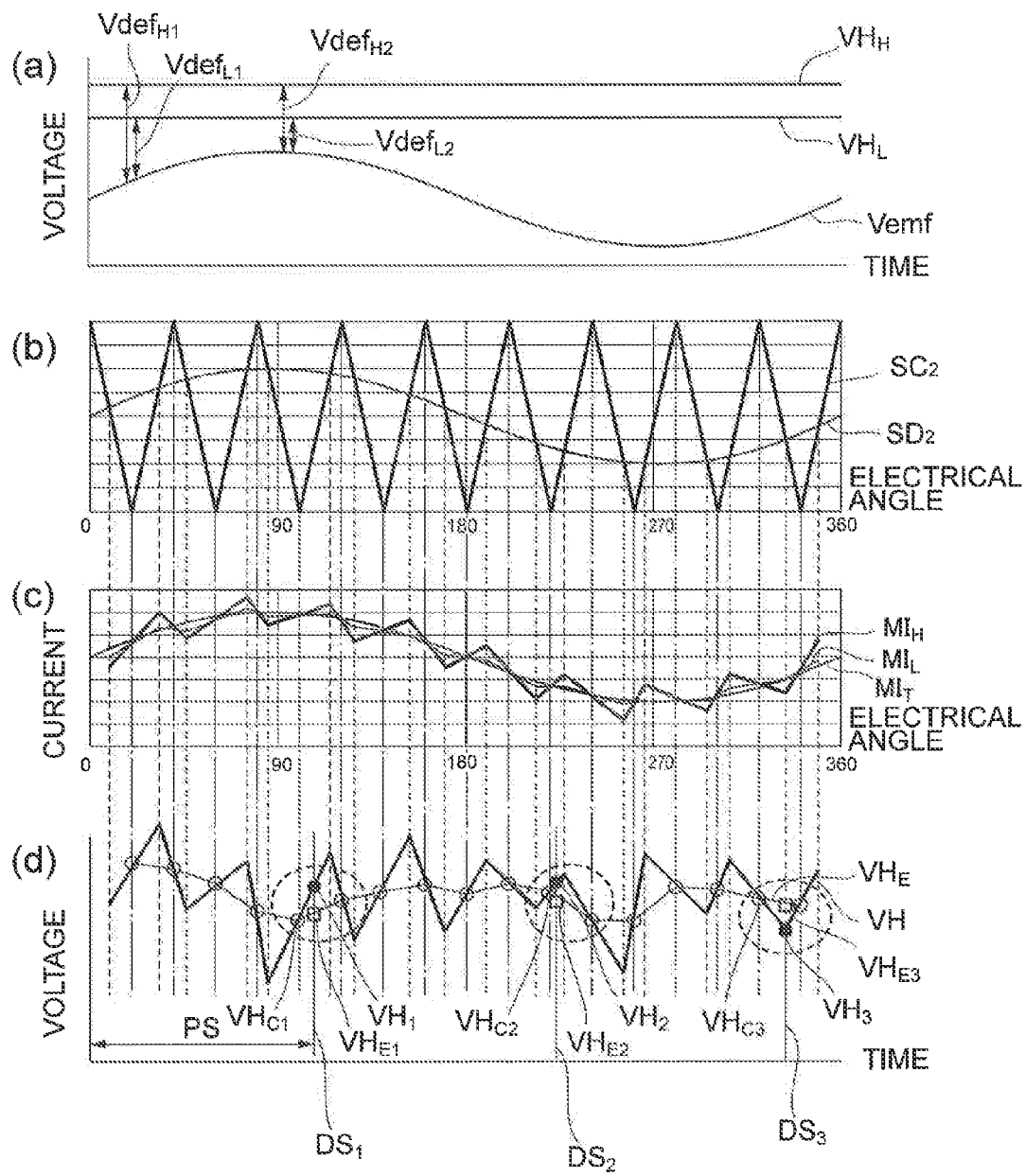
FIG. 4 is an explanatory view of a sampling timing of a DC high voltage according to the first embodiment, and specifically.

A two-motor system 1 according to a first embodiment will be described referring to FIGS. 1 to 4. FIG. 1 is a block diagram showing the configuration of a two-motor system according to the first embodiment. FIG. 2 is an explanatory view of a method of calculating a target voltage of each motor. FIG. 3 is an explanatory view of a method of determining a target voltage in a two-motor system, and specifically, FIG. 3(a) shows the flow of a determination method, and FIG. 3(b) shows an example of a map of a system voltage and system loss for two motors. FIG. 4 is an explanatory view of a sampling timing of a DC high voltage according to the first embodiment, and specifically, FIG. 4(a) is a relationship diagram between high and low DC high voltages and a motor induced voltage, FIG. 4(b) shows a carrier signal and a duty signal in inverter control, FIG. 4(c) shows a motor target current and a motor actual current, and FIG. 4(d) shows a DC high voltage and a sampling timing request signal.

The two-motor system 1 includes a battery 10, a filter capacitor 11, a voltage boost converter 12, a smoothing capacitor 13, a first inverter 14, a second inverter 15, a first motor 16, a second motor 17, and a motor ECU 18. in this embodiment, the battery 10 corresponds to a power supply described in the appended claims, the voltage boost converter 12 corresponds to a voltage conversion circuit described in the appended claims, the smoothing capacitor 13 corresponds to a capacitor described in the appended claims, the first inverter 14 and the second inverter 15 correspond to a motor control circuit described in the appended claims, and the first motor 16 and the second motor 17 correspond to a plurality of motors described in the appended claims.

In the two-motor system 1, DC power of the battery 10 is converted to three-phase AC power of the motors 16 and 17 in accordance with motor torque commands $DT_1$ and $DT_2$ from a traveling control ECU 19 to the motors 16 and 17, and three-phase AC power is supplied to the motors 16 and 17. For this purpose, in the motor ECU 18, a target voltage $VH_T$ of the system is selected from among target voltages $VH_{T1}$ and $VH_{T2}$ necessary for driving the motors 16 and 17, voltage boost control on the voltage boost converter 12 is performed so as to boost a voltage from a DC low voltage VL of the battery 10 to the target voltage $VH_T$ (DC high voltage VH) of the system, and inverter control on the inverters 14 and 15 is performed so as to convert DC power to three-phase AC power necessary for generating the motor torque commands $DT_1$ and $DT_2$ for the motors 16 and 17. In particular, in the motor ECU 18, in order to perform stable voltage boost control even when there is pulsation in the DC high voltage VH caused by the pulsation of a motor current due to the effect of switching noise on the inverter control side, a carrier signal of the inverter control of the motor having the target voltage not selected as the target voltage $VH_T$ of the system is selected from among carrier signals $SC_1$ and $SC_2$ of the inverter control of the motors 16 and 17, the DC high voltage (the voltage across both ends of the smoothing capacitor 13) VH is sampled at the timing of a crest and a trough of the selected carrier signal, and for each VH sensor sampling timing request signal DS, voltage boost control is performed using the DC high voltage sampled at the timing of the crest or trough of the carrier signal immediately before the request signal DS.

The traveling control ECU 19 is an ECU which is provided so as to control traveling of the vehicle. In the traveling control ECU 19, a target motor torque required by the first motor 16 and a target motor torque required by the second motor are calculated on the basis of the traveling state of the vehicle at this time in accordance with an acceleration request or a braking request of a driver or automatic driving, and the target motor torques are output to the motor ECU 18 as the motor torque commands $DT_1$ and $DT_2$.

The battery 10 is a DC power supply and a secondary battery. The filter capacitor 11 is provided between the battery 10 and the voltage boost converter 12 and connected in parallel to the battery 10. The filter capacitor 11 smoothes the DC voltage of the battery 10 and stores the electric charges of the DC voltage. The voltage across both ends of the filter capacitor 11 is the DC low voltage VL. The filter capacitor 11 is a capacitor which is provided so as to prevent a pulsating current due to switching from flowing to the battery 10 side.

The voltage boost converter 12 has a reactor 12*a*, switching elements 12*b* and 12*c*, and reflux diodes 12*d* and 12*e*. A high-voltage side of the filter capacitor 11 is connected to one end of the reactor 12*a*, A connection point of the switching element 12*b* and the switching element 12*c* is connected to the other end of the reactor 12*a*. An IL sensor 12*f* detects a current IL (analog value) which flows in the reactor 12*a* and outputs the detected current IL to the motor ECU 18. The switching element 12*b* and the switching element 12*c* are connected in series together, a high-voltage side of the smoothing capacitor 13 is connected to the collector of the switching element 12*b*, and a low-voltage side of the smoothing capacitor 13 is connected to the emitter of the switching element 12*c*. The reflux diodes 12*d* and 12*e* are respectively connected in inversely parallel to the switching elements 12*b* and 12*c*. With this circuit configuration, in the voltage boost converter 12, the switching elements 12*b* and 12*c* are subjected to switching control on the basis of gate signals for the switching elements 12*b* and 12*c* output from the motor ECU 18, and the DC low voltage VL of the filter capacitor 11 is converted to the DC high voltage VH.

The smoothing capacitor 13 is provided between the voltage boost converter 12 and the first and second inverters 14 and 15. The smoothing capacitor 13 smoothes the DC voltage boosted by the voltage boost converter 12, and stores the electric charges of the DC voltage. The voltage across both ends of the smoothing capacitor 13 is the DC high voltage VH. A VH sensor 13*a* detects the voltage (analog value) VH across both ends of the smoothing capacitor 13 and outputs the detected voltage to the motor ECU 18.

The first inverter 14 is an inverter which converts DC power to three-phase AC power so as to drive the first motor 16 in the two-motor system. The second inverter 15 is an inverter which converts DC power to three-phase AC power so as to drive the second motor 17 in the two-motor system. The first inverter 14 and the second inverter 15 are the same circuits and general inverter circuits of the related art which converts DC power to three-phase AC power, thus a detailed circuit configuration will not be described. In the first inverter 14, the DC high voltage VH of the smoothing capacitor 13 is supplied, the switching elements of the respective phases are subjected to switching control on the basis of the gate signals for the switching elements corresponding to the respective phases (U phase, V phase, and W phase) of the first motor 16 output from the motor ECU 18, DC power is converted to three-phase AC power, and three-phase AC power is supplied to the first motor 16. Similarly, in the second inverter 15, DC power is converted to three-phase AC power on the basis of the gate signals corresponding to the respective phases of the second motor 17 output from the motor ECU 18, and three-phase AC power is supplied to the second motor 17.

The first motor 16 and the second motor 17 are AC motors and driving sources of the vehicle. The first motor 16 is driven to rotate when three-phase AC power from the first inverter 14 is supplied to the coil (not shown) of each phase. The second motor 17 is driven to rotate when three-phase AC power from the second inverter 15 is supplied to the coil (not shown) of each phase. Note that one of the two motors may be a generator or a motor generator, and the two motors may be motor generators.

The motor ECU 18 is an electronic control unit which has a microcomputer, various memories, and the like, and performs motor control. In particular, the motor ECU 18 has an inverter control function (first motor control unit 18*a*, second motor control unit 18*b*, first motor gate generation unit 18*c*, and second motor gate generation unit 18*d*) which performs control on the inverters 14 and 15, and a voltage boost control function (first motor target voltage calculation unit 18*e*, second motor target voltage calculation unit 18*f*, voltage control unit 18*g*, current control unit 18*h*, gate generation unit 18*i*, carrier selection/target voltage selection unit 18*j*, VH sensor sampling timing generator 18*k*, and VH sensor data update unit 18*l*) which performs control on the voltage boost converter 12. In the first embodiment, the first motor target voltage calculation unit 18*e* and the second motor target voltage calculation unit 18*f* correspond to target voltage setting means described in the appended claims, the carrier selection/target voltage selection unit 18*j* corresponds to selection means described in the appended claims, the VH sensor sampling timing generator 18*k* corresponds to sampling timing generation means described in the appended claims, the voltage control unit 18*g* and the VH sensor data update unit 18*l* correspond to control means described in the appended claims, and the VH sensor 13*a* and the AD converter 18*m* correspond to sampling means described in the appended claims.

The inverter control function will be described. In the inverter control function, the first motor control unit 18*a* and the first motor gate generation unit 18*c* perform inverter control on the first inverter 14 (consequently, the first motor 16), and the second motor control unit 18*b* and the second motor gate generation unit 18*d* perform inverter control on the second inverter 15 (consequently, the second motor 17).

In the first motor control unit 18*a*, a first motor torque command $DT_1$ for the first motor 16 is input from the traveling control ECU 19, and a first carrier signal $SC_1$ and a first duty signal $SD_1$ for generating the target motor torque of the first motor torque command $DT_1$ are generated using a motor angle detected by an angle sensor and a motor current detected by a current sensor from the first motor 16 and are output to the first motor gate generation unit 18*c*. In the first motor control unit 18*a*, a first motor rotation speed $MR_1$ and the first motor torque command $DT_1$ of the first motor 16 are output to the first motor target voltage calculation unit 18*e* of the voltage boost control function. In the first motor control unit 18a, the first carrier signal $SC_1$ is output to the VH sensor sampling timing generator 18k of the voltage boost control function.

In the second motor control unit 18b, the second motor torque command $DT_2$ for the second motor 17 is input from the traveling control ECU 19, and a second carrier signal $SC_2$ and a second duty signal $SD_2$ for generating the target motor torque of the second motor torque command $DT_2$ are generated using a motor angle detected by an angle sensor and a motor current detected by a current sensor from the second motor 17 and are output to the second motor gate generation unit 18d. In the second motor control unit 18b, a second motor rotation speed $MR_2$ and the second motor torque command. $DT_2$ of the second motor 17 are output to the second motor target voltage calculation unit 18f of the voltage boost control function. In the second motor control unit 18b, the second carrier signal $SC_2$ is output to the VH sensor sampling timing generator 18k of the voltage boost control function.

In the first motor gate generation unit 18c, the first carrier signal $SC_1$ and the first duty signal $SD_1$ are input from the first motor control unit 18a, and the gate signals (for example, a PWM signal) of the switching elements of the respective phases of the first inverter 14 are generated on the basis of the first carrier signal $SC_1$ and the first duty signal $SD_1$ and are output to the first inverter 14.

In the second motor gate generation unit 18d, the second carrier signal $SC_2$ and the second duty signal $SD_2$ are input from the second motor control unit 18b, and the gate signals of the switching elements of the respective phases of the second inverter 15 are generated on the basis of the second carrier signal $SC_2$ and the second duty signal $SD_2$ and are output to the second inverter 15. FIG. 4(b) shows an example of the second carrier signal. $SC_2$ and the second duty signal $SD_2$ of the inverter control of the second motor 17, and the gate signals which turn on/off the switching elements of the second inverter 15 are generated at the timing of the intersection point of the second carrier signal $SC_2$ and the second duty signal $SD_2$.

The carrier signal SC is a carrier frequency and a switching frequency of each of the switching elements of the inverters 14 and 15. As shown in FIG. 4(b), the carrier signal SC is, for example, a chopping wave with a crest and a trough as an apex. In order to allow the motors 16 and 17 to output high rotation or high torque, it is necessary to raise the carrier frequency. However, if system loss increases because the temperature of the switching elements of the inverters 14 and 15 becomes high, or the like, it is necessary to lower the carrier frequency. The duty signal SD is a signal for determining the duty ratio of the on and off of the switching elements of the inverters 14 and 15. As shown in FIG. 4(b), the duty signal SD is, for example, a sinusoidal wave.

The switching elements of the inverters 14 and 15 are switched at the timing of the intersection point of the carrier signal SC and the duty signal SD, and a pulsation component is superimposed on the motor current by the effect of the switching. FIG. 4(c) shows a target current $MI_T$ of the second motor 17 in which the gate signals are generated from the second carrier signal $SC_2$ and the second signal $SD_2$ of FIG. 4(b), an actual current $MI_H$ of the second motor 17 when a large pulsation component is superimposed, and an actual current $MI_L$ of the second motor 17 when a small pulsation component is superimposed. As will be understood from FIG. 4(c), the actual currents $MI_H$ and $MI_L$ of the second motor 17 have a crest or a trough at the intersection point of the second carrier signal $SC_2$ and the second duty signal $SD_2$, and the crest or the trough becomes a change point of an increase/decrease in the pulsation component.

The voltage boost control function will be described. In the first motor target voltage calculation unit 18e, the first motor rotation speed $MR_1$ and the first motor torque command $DT_1$ are input from the first motor control unit 18a of the inverter control function, and a first target voltage $VH_{T1}$ for the first motor 16 is calculated on the basis of the first motor rotation speed $MR_1$ and the first motor torque command $DT_1$, and is output to the carrier selection/target voltage selection unit 18j. In the second motor target voltage calculation unit 18f, the second motor rotation speed $MR_2$ and the second motor torque command $DT_2$ are input from the second motor control unit 18b of the inverter control function, and a second target voltage $VH_{T2}$ for the second motor 17 is calculated on the basis of the second motor rotation speed $MR_2$ and the second motor torque command $DT_2$, and is output to the carrier selection/target voltage selection unit 18j.

The first motor target voltage calculation unit 18e and the second motor target voltage calculation unit 18f calculate the target voltages by the same processing. This processing will be described below. As shown in. FIG. 2, first, an intersection point P1 of the motor rotation speeds $MR_1$ and $MR_2$ and the motor torques of the motor torque commands $DT_1$ and $DT_2$ is extracted from map M1 of a motor rotation speed and a motor torque. The map M1 has a field-weakening control region A1 (hatched region) and a PWM control region A2, and the ranges of the control regions change depending on the level of the system voltage (DC high voltage VH) of the two-motor system 1. In the example shown in FIG. 2, since the intersection point P1 is placed within the field-weakening control region A1, field-weakening control is made. As shown in FIG. 2, the target voltage $VH_T$ at which system loss is minimal is calculated from a map M2 of the system voltage and system loss which changes depending on the intersection point P1.

System loss is loss in the switching elements or the like of the two-motor system 1. If a system voltage becomes a high voltage, while the motors 16 and 17 easily rotate, system loss increases. In regard to a method of obtaining a target voltage of voltage boost control, as described above, although a method using a map has been described, other methods may be used.

In the voltage control unit 18g, as shown in FIG. 4(d), for each sampling timing period PS, a VH sensor sampling timing request signal DS is output to the VH sensor data update unit 18l, and the DC high voltage VH (digital value) sampled for use in the voltage boost control is input from the VH sensor data update unit 18l in response to the VH sensor sampling timing request signal DS. The sampling timing period PS may be a fixed value defined in advance or a variable value. Since the sampling timing period PS is set without relation to the inverter control, the VH sensor sampling timing request signal DS is not synchronized with the carrier signal SC of the inverter control. In the voltage control unit 18g, the target voltage $VH_T$ of the system is input from the carrier selection/target voltage selection unit 18j, and control is performed such that the voltage (DC high voltage) across both ends of the smoothing capacitor 13 becomes the target voltage $VH_T$ using the DC high voltage VH (digital value) from the VH sensor data update unit 18l. At this time, in the voltage control unit 18g, a target current $IL_T$ necessary for this control is calculated and output to the current control unit 18h.

In the current control unit 18h, the target current $IL_T$ is input from the voltage control unit 18g, and control is performed such that the current flowing in the reactor 12a becomes the target current $IL_T$ using the current IL (digital value) flowing in the reactor 12a. The current IL (digital value) for use in the control is a current (digital value) which is obtained by AD converting a current (analog value) detected by the IL sensor 12f using the AD converter 18n in the motor ECU 18.

In the gate generation unit 18i, the gate signals (for example, PWM signal) of the switching elements 12b and 12c of the voltage boost converter 12 are generated on the basis of the control toward becoming the target voltage $VH_T$ in the voltage control unit 18g and the control toward becoming the target current $IL_T$ in the current control unit 18h, and are output to the voltage boost converter 12.

In the carrier selection/target voltage selection unit 18j, the first target voltage $VH_{T1}$ is input from the first motor target voltage calculation unit 18e, and the second target voltage $VH_{T2}$ is input from the second motor target voltage calculation unit 18f. As shown in FIG. 3, in the first motor target voltage calculation unit 18e, the first target voltage $VH_{T1}$ at which system loss is minimal on the first motor 16 side is calculated from a map M2a corresponding to the intersection point of the first motor rotation speed $MR_1$ and the motor torque of the first motor torque command $DT_1$, and in the second motor target voltage calculation unit 18f, the second target voltage $VH_{T2}$ at which system loss is minimal on the second motor 17 side is calculated from a map M2b corresponding to the intersection point of the second motor rotation speed $MR_2$ and the motor torque of the second motor torque command $DT_2$. As will be understood from the example of FIG. 3, since the first target voltage $VH_{T1}$ and the second target voltage $VH_{T2}$ are calculated separately from the motor rotation speeds and the motor torque commands for the motors 16 and 17, and usually become different voltages. For this reason, it is necessary to select the target voltage of the two-motor system 1 from among the two voltages of the first target voltage $VH_{T1}$ and the second target voltage $VH_{T2}$, and as shown in FIG. 3(a), the maximum value (higher voltage) from among the first target voltage $VH_{T1}$ and the second target voltage $VH_{T2}$ is set as a command value of the target voltage of the two-motor system 1 such that optimum system efficiency is obtained. Accordingly, in the carrier selection/target voltage selection unit 18j, each time the first target voltage $VH_{T1}$ and the second target voltage $VH_{T2}$ are input, a higher voltage from among the first target voltage $VH_{T1}$ and the second target voltage $VH_{T2}$ is selected as the target voltage $VH_T$ of the two-motor system 1. In the carrier selection/target voltage selection unit 18j, the target voltage $VH_T$ is output to the voltage control unit 18g. In the carrier selection/target voltage selection unit 18j, a carrier selection signal SS for selecting the carrier signal of the motor having the target voltage not selected as the target voltage $VH_T$ of the two-motor system 1 is output to the VH sensor sampling timing generator 18k. The carrier selection signal SS is, for example, a signal which represents one of the first motor 16 and the second motor 17 (the motor having the target voltage not selected as the target voltage $VH_T$ of the two-motor system 1).

In the VH sensor sampling timing generator 18k, the first carrier signal $SC_1$ from the first motor control unit 18a of the inverter control function and the second carrier signal $SC_2$ from the second motor control unit 18b are input, and the carrier selection signal SS is input from the carrier selection/target voltage selection unit 18j. In the VH sensor sampling timing generator 18k, the carrier signal of the motor having the target voltage not selected as the target voltage $VH_T$ of the two-motor system 1 from among the first carrier signal $SC_1$ and the second carrier signal $SC_2$ is selected as a carrier signal $SC_S$ for use in generating the VH sensor sampling timing TS on the basis of the carrier selection signal. SS. In the VH sensor sampling timing generator 18k, the timing of the crest (a high apex of a chopping wave) and the timing of the trough (a low apex of a chopping wave) of the carrier signal $SC_S$ are output to the AD converter 18m as the VH sensor sampling timing TS. In the AD converter 18m, each time the VH sensor sampling timing TS is input from the VH sensor sampling timing generator 18k, the DC high voltage (analog value) VH detected by the VH sensor 13a is AD converted, and the DC high voltage (digital value) VH after AD conversion is output to the VH sensor data update unit 18l.

In the VH sensor data update unit 18l, each time the DC high voltage (digital value) VH is input from the AD converter 18m, the DC high voltage (digital value) VH is stored in a time-series manner. Only the input latest DC high voltage (digital value) VH may be stored. In the VH sensor data update unit 18l, each time the VH sensor sampling timing request signal DS is input from the voltage control unit 18g, the DC high voltage (digital value) VH input from the AD converter 18m immediately before the VH sensor sampling timing request signal DS is output to the voltage control unit 18g as a VH sensor value for use in the voltage boost control.

Referring to FIG. 4, the reason that stable voltage boost control can be performed even when there is pulsation in the DC high voltage VH caused by the pulsation of the motor current due to the effect of switching on the inverter control side from the processing in the voltage boost control function described above will be described. An example shown in FIG. 4 is a case where the motor having the target voltage not selected as the target voltage $VH_T$ of the two-motor system 1 is the second motor 17.

If the carrier frequency in the inverter control is lowered so as to suppress system loss, a pulsation component is superimposed on the voltage (DC high voltage after boosting) across both ends of the smoothing capacitor due to switching noise of the inverter control. While the target voltage necessary for driving the motor changes depending on the motor rotation speed or torque, as the target voltage becomes high, and the DC high voltage VH becomes high with respect to the motor induced voltage Vemf, the voltage difference Vdef increases, and the pulsation component of the DC high voltage increases.

FIG. 4(a) shows the relationship the voltage $VH_H$ when the DC high voltage VH is high and the voltage $VH_L$ when the DC high voltage VH is low, and the motor induced voltage Vemf. When comparing the voltage differences $Vdef_{H1}$ and $Vdef_{H2}$ between the DC high voltage $VH_H$ when the DC high voltage is high and the motor induced voltage Vemf with the voltage differences $Vdef_{L1}$ and $Vdef_{L2}$ between the DC high voltage $VH_L$ when the DC high voltage VH is low and the motor induced voltage Vemf, the voltage difference Vdef becomes larger in the case of the DC high voltage $VH_H$ when the DC high voltage VH is high. As the voltage difference Vdef increases, a pulsation component which is imposed on the motor current increases. In particular, in a case of the two-motor system 1, a higher voltage from among the first target voltage $VH_{T1}$ and the second target voltage $VH_{T2}$ of the motors 16 and 17 is selected as the target voltage $VH_T$ of the two-motor system 1, and the DC high voltage VH is controlled so as to become the target voltage $VH_T$. For this reason, in the motor having the target voltage not selected as the target voltage $VH_T$ of the two-motor system 1, the motor induced voltage Vemf is lowered with respect to the DC high voltage VH, and the voltage difference Vdef between the DC high voltage VH and the motor induced voltage Vemf becomes larger.

FIG. 4(c) shows a target current $MI_T$ of the second motor 17, an actual current $MI_H$ of the second motor 17 in a case of the large voltage difference $Vdef_H$, and an actual current $MI_L$ of the second motor 17 in a case of the small voltage difference $Vdef_L$. A pulsation component is superimposed on the actual currents $MI_H$ and $MI_L$ of the second motor 17 due to switching of the switching elements of the second inverter 15, and an increase/decrease in the pulsation component is switched at the intersection point of the second carrier signal $SC_2$ and the second duty signal $SD_2$ shown in FIG. 4(b). As will be understood from FIG. 4(c), as the voltage difference Vdef is large, a pulsation component which is superimposed on the motor current MI increases. In particular, as described above, in a case of the two-motor system 1, since the voltage difference Vdef in the motor having the target voltage not selected as the target voltage $VH_T$ of the two-motor system 1 becomes larger, a pulsation component which is superimposed on the actual current MI of the motor having the target voltage not selected as the target voltage $VH_T$ of the two-motor system 1 increases.

FIG. 4(d) shows the DC high voltage VH with respect to the motor current $MI_H$ in a case of the large voltage difference $Vdef_H$. The DC high voltage VH has a pulsation component superimposed thereon in accordance with a pulsation component in the motor current $MI_H$, and an increase/decrease in the pulsation component is switched at the intersection point of the second carrier signal $SC_2$ and the second duty signal $SD_2$ shown in FIG. 4(b). In this way, if pulsation occurs in the motor current due to the effect of switching on the inverter side (in particular, on the inverter side of the motor having the target voltage not selected as the target voltage $VH_T$ of the two-motor system 1), a pulsation component is also superimposed on the DC high voltage after boosting. While switching on the inverter side of the motor having the target voltage not selected as the target voltage $VH_T$ of the two-motor system 1 affects the pulsation of the motor current (consequently, the pulsation of the DC high voltage after boosting), the effect is very small compared to the effect of switching on the inverter side of the motor having the target voltage not selected as the target voltage $VH_T$ of the two-motor system 1.

That is, the pulsation component (fluctuation) which is superimposed on the motor current MI by switching of the inverter control is determined by the voltage difference Vdef between the DC high voltage VH and the motor induced voltage Vemf, and the carrier frequency (carrier signal SC) of the inverter control. For this reason, if the inverter frequency is lowered when the voltage difference Vdef is large, the pulsation component which is superimposed on the motor current MI increases. In particular, the pulsation component is affected by switching of the inverter control of the motor having the target voltage not selected as the target voltage $VH_T$ of the two-motor system 1. When the capacitance of the smoothing capacitor 13 is small, if the pulsation component which is superimposed on the motor current MI increases, the smoothing ability of the smoothing capacitor 13 is not enough, a pulsation component is also superimposed on the voltage (DC high voltage) VH across both ends of the smoothing capacitor 13, and the DC high voltage VH after boosting fluctuates largely. In order to achieve low-cost and reduction in size of the two-motor system 1, the capacitance of the smoothing capacitor 13 having large capacitance is needed to be as small as possible. Accordingly, if the capacitance of the smoothing capacitor 13 is made small in accordance with the need, as described above, pulsation occurs in the DC high voltage VH.

As described above, in regard to the pulsation component by switching of the inverter control, an increase/decrease in the pulsation component is switched at the intersection point of the carrier signal and the duty signal. Accordingly, as will be understood from FIGS. 4(b) and 4(c), since the crest or trough of the carrier signal $SC_2$ substantially becomes an intermediate point between the intersection points of the carrier signal $SC_2$ and the duty signal $SD_2$, an intermediate value between the crest and the trough of the motor current MI having the pulsation component superimposed thereon is obtained in the proximity of the timing of the crest or trough of the carrier signal $SC_2$ of the motor having the target voltage not selected as the target voltage $VH_T$ of the two-motor system 1. Accordingly, as will be understood from FIGS. 4(b) and 4(d), the intermediate value (that is, the expected value $VH_E$ of the DC high voltage for stably performing the voltage boost control) between the crest and the trough of the DC high voltage VH having the pulsation component superimposed thereon is obtained in the proximity of the timing of the crest or trough of the carrier signal $SC_2$ of the motor having the target voltage not selected as the target voltage $VH_T$ of the two-motor system 1. As will be understood of the example shown in FIG. 4(d), the DC high voltage VH at the timing of the crest and the trough of the carrier signal $SC_2$ indicated by a white circle substantially matches the expected value $VH_E$ of the DC high voltage. The expected value $VH_E$ of the DC high voltage is the intermediate value between the crest and the trough of the DC high voltage VH and the DC high voltage in which a pulsation component is substantially removed.

Accordingly, in the voltage boost control function of the motor ECU 18, the VH sensor sampling timing generator 18k generates the VH sensor sampling timing TS at each timing of the crest and the trough of the carrier signal of the motor having the target voltage not selected as the target voltage $VH_T$ of the two-motor system 1 significantly affecting the pulsation of the motor current, the AD converter 18m AD converts the DC high voltage (analog value) VH detected by the VH sensor 13a for each VH sensor sampling timing TS to acquire the DC high voltage (digital value) VH.

As will be understood from the example shown in FIG. 4(d), when comparing the expected values $VH_{E1}$, $VH_{E2}$, and $VH_{E3}$ of the DC high voltage at the timing of the VH sensor sampling timing request signals $DS_1$, $DS_2$, and $DS_3$ with the DC high voltage $VH_{C1}$, $VH_{C2}$, and $VH_{C3}$ at the timing of the crest or trough of the carrier signal $SC_2$ immediately before the VH sensor sampling timing request signals $DS_1$, $DS_2$, and $DS_3$, the differences are very small. Accordingly, the DC high voltage VH (VH sensor value) at the timing of the crest or trough of the carrier signal $SC_2$ immediately before the VH sensor sampling timing request signal DS is acquired, whereby a value which is very close to the expected value $VH_E$ of the DC high voltage at the timing of the VH sensor sampling timing request signal DS can be obtained.

Accordingly, in the voltage boost control function of the motor ECU 18, the VH sensor data update unit 18l outputs the DC high voltage (digital value) VH at the timing of the crest or trough of the carrier signal (the carrier signal of the motor having the target voltage not selected as the target voltage $VH_T$ of the two-motor system) input from the AD converter 18m immediately before the VH sensor sampling timing request signal DS to the voltage control unit 18g each time the VH sensor sampling timing request signal DS is input from the voltage control unit 18g. In the voltage control unit 18g, the voltage boost control is performed using the DC high voltage (VH sensor value) VH at the timing of the crest or trough of the carrier signal immediately before the VH sensor sampling timing request signal DS, whereby control can be performed using the DC high voltage VH (VH sensor value) close to the expected value $VH_E$ of the DC high voltage at the moment of the VH sensor sampling timing request signal DS.

According to the two-motor system 1 (in particular, the voltage boost control in the motor ECU 18), the DC high voltage VH for use in the voltage boost control is sampled on the basis of the carrier signal of the inverter control of the motor having the target voltage not selected as the target voltage $VH_T$ of the two-motor system 1 (the inverter control and the voltage boost control are cooperated with each other). For this reason, even when a pulsation component is superimposed on the DC high voltage VH, the DC high voltage VH close to the expected value $VH_E$ of the DC high voltage at the moment of the VH sensor sampling timing request signal DS can be sampled, the difference between the expected value $VH_E$ of the DC high voltage at the moment of the VH sensor sampling timing request signal DS and the VH sensor value which is actually used in the voltage boost control decreases, whereby stable voltage boost control can be performed. Therefore, it is possible to reduce the capacitance of the smoothing capacitor 13 to the limit, and to achieve low-cost and reduction in size of the two-motor system 1.

In particular, in the two-motor system 1 of the first embodiment, the carrier signal of the inverter control of the motor having the target voltage not selected as the target voltage $VH_T$ of the two-motor system 1 is selected, the DC high voltage VH is sampled at the timing of the crest and the trough of the carrier signal, and the DC high voltage VH sampled at the timing of the crest or trough of the carrier signal immediately before the VH sensor sampling timing request signal DS is used in the voltage boost control, whereby the voltage boost control can be performed using the sensor value of the DC high voltage VH close to the expected value $VH_E$ of the DC high voltage at the moment of the VH sensor sampling timing request signal DS, and stable voltage boost control can be performed.

Figure 5:
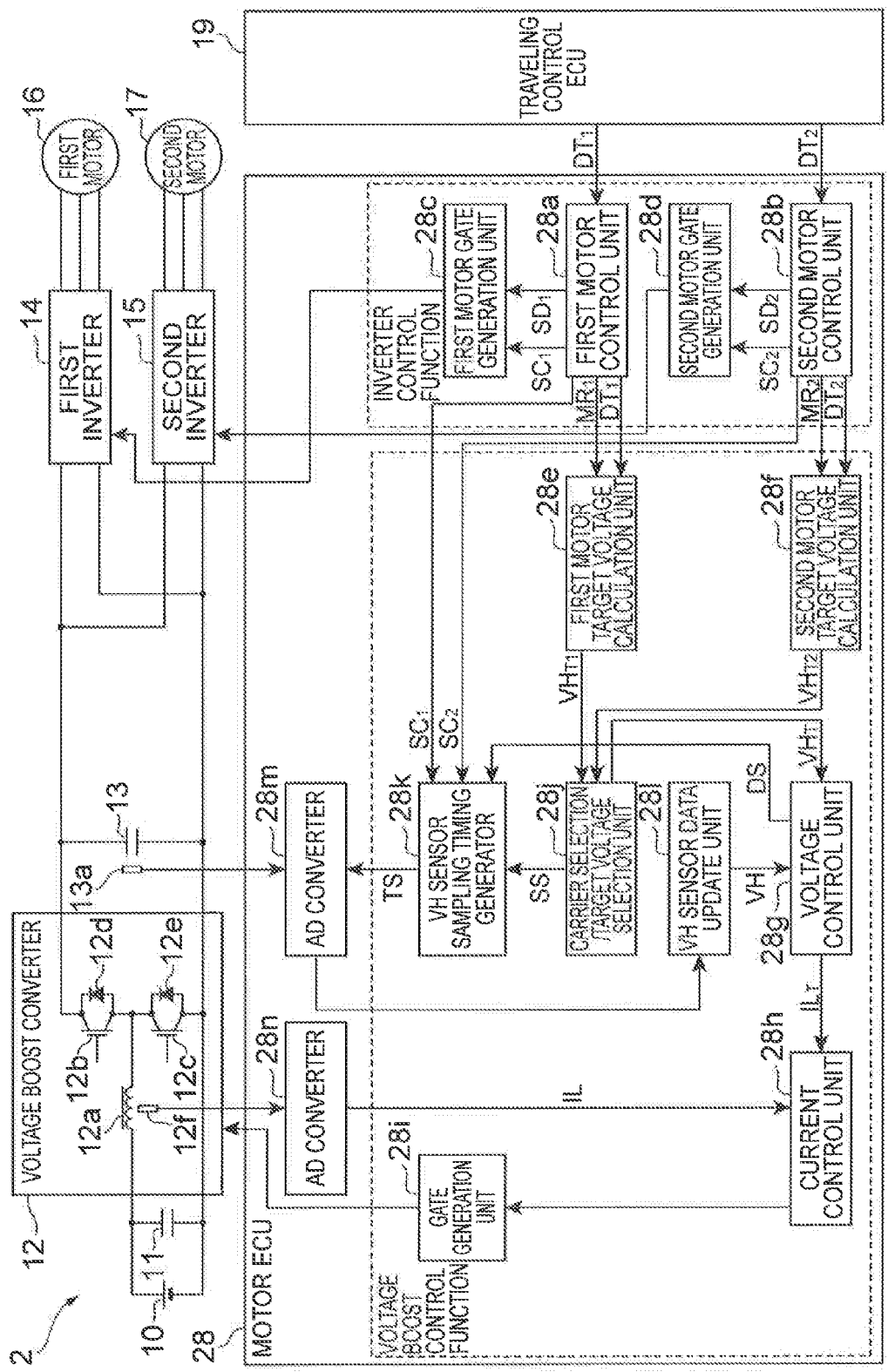
FIG. 5 is a block diagram showing the configuration of a two-motor system according to a second embodiment.
Figure 6:
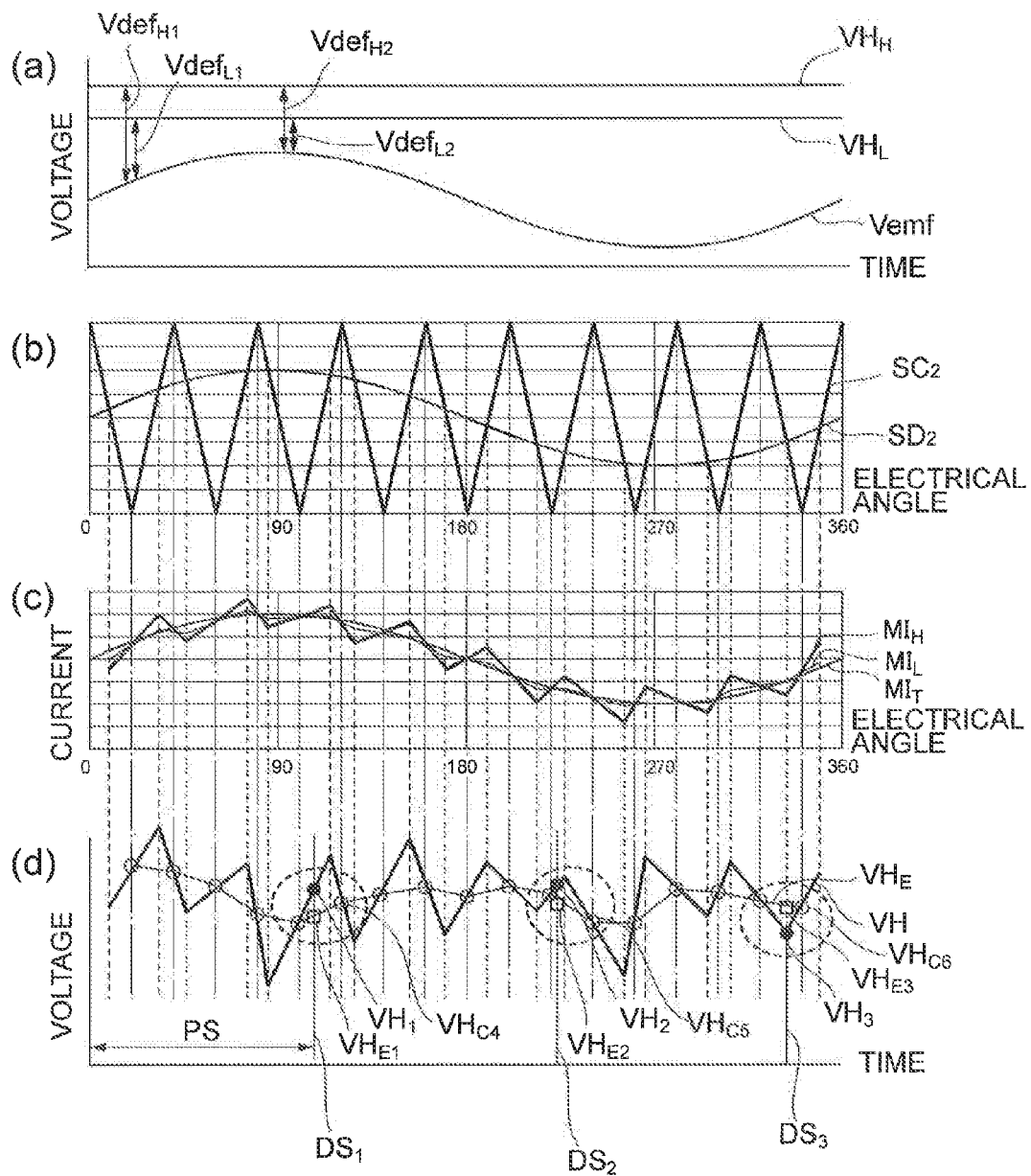
FIG. 6 is an explanatory view of a sampling timing of a DC high voltage according to the second embodiment, and specifically.
Figure 7:
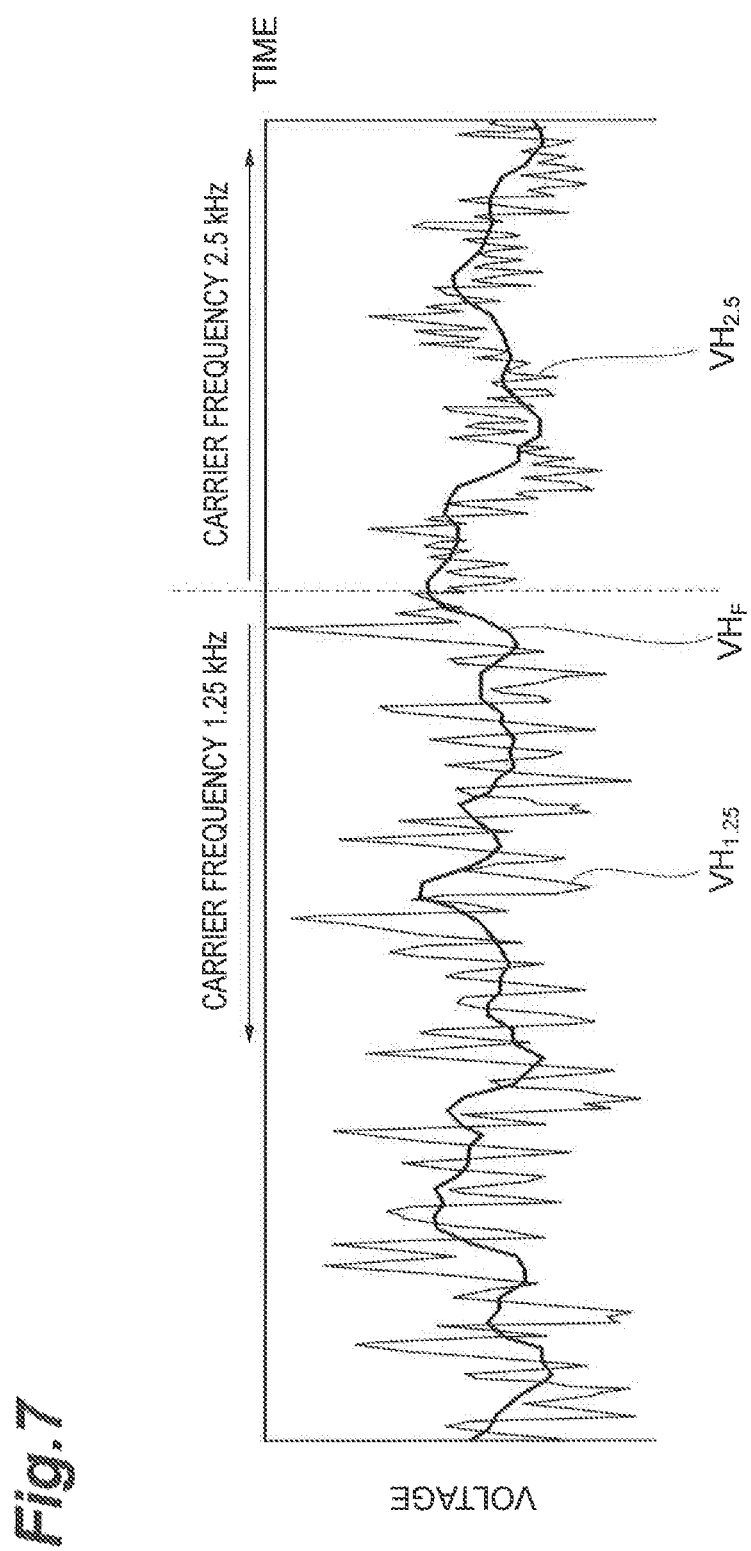
FIG. 7 is a diagram showing change in a DC high voltage when a carrier frequency is high and low.
Figure 8:
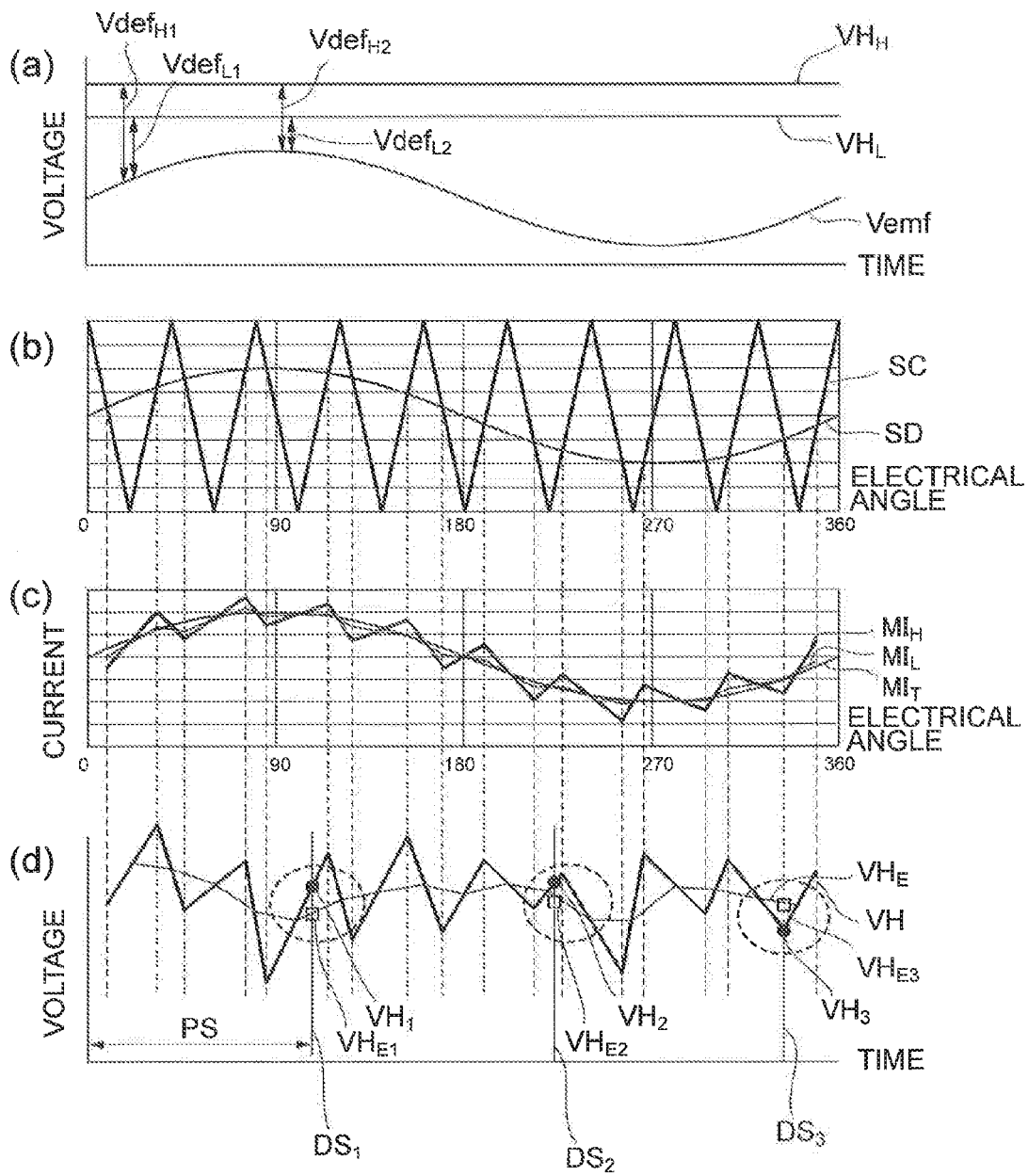
FIG. 8 is an explanatory view of the occurrence of pulsation in a DC high voltage, and specifically.

Next, a two-motor system 2 according to a second embodiment will be described referring to FIGS. 5 and 6. FIG. 5 is a block diagram showing the configuration of a two-motor system according to a second embodiment. FIG. 6 is an explanatory view of a sampling timing of a DC high voltage according to the second embodiment, and specifically, FIG. 6(a) is a relationship diagram between high and low DC high voltages and a motor induced voltage, FIG. 6(b) shows a carrier signal and a duty signal in inverter control, FIG. 6(c) shows a motor target current and a motor actual current, and FIG. 6(d) shows a DC high voltage and a sampling timing request signal.

The two-motor system 2 includes a battery 10, a filter capacitor 11, a voltage boost converter 12, a smoothing capacitor 13, a first inverter 14, a second inverter 15, a first motor 16, a second motor 17, and a motor ECU 28. The two-motor system 2 is different from the two-motor system 1 of the first embodiment in that control (in particular, the sampling timing of the VH sensor value for use in the voltage boost control) in the motor ECU 28 is different in the motor ECU 28, in order to perform stable voltage boost control even when there is pulsation in the DC high voltage VH caused by the pulsation of the motor current due to the effect of switching noise on the inverter control side, the carrier signal SC of the inverter control of the motor having the target voltage not selected as the target voltage $VH_T$ of the system is selected, for each VH sensor sampling timing request signal DS, the DC high voltage (the voltage across both ends of the smoothing capacitor 13) VH is sampled at the timing of the crest or trough of the selected carrier signal SC immediately after the request signal. DS, and the voltage boost control is performed using the sampled DC high voltage VH. Here, only the motor ECU 28 will be described in detail.

The motor ECU 28 is an electronic control unit which has a microcomputer, various memories, and the like, and performs motor control. In particular, the motor ECU 28 has an inverter control function (first motor control unit 28a, second motor control unit 28b, first motor gate generation unit 28c, and second motor gate generation unit 28d) which performs control on the inverters 14 and 15, and a voltage boost control function (first motor target voltage calculation unit 28e, second motor target voltage calculation unit 28f, voltage control unit 28g, current control unit 28h, gate generation unit 28i, carrier selection/target voltage selection unit 28j, VH sensor sampling timing generator 28k, and VH sensor data update unit 28l) which performs control on the voltage boost converter 12. In the second embodiment, the first motor target voltage calculation unit 28e and the second motor target voltage calculation unit 28f correspond to target voltage setting means described in the appended claims, the carrier selection/target voltage selection unit 28j corresponds to selection means described in the appended claims, the VH sensor sampling timing generator 28k corresponds to sampling timing generation means described in the appended claims, the voltage control unit 28g and the VH sensor data update unit 28l correspond to control means described in the appended claims, and the VH sensor 13a and the AD converter 28m correspond to sampling means described in the appended claims.

The first motor control unit 28a, the second motor control unit 28b, the first motor gate generation unit 28c, the second motor gate generation unit 28d, the first motor target voltage calculation unit 28e, the second motor target voltage calculation unit 28f, the voltage control unit 28g, the current control unit 28h, the gate generation unit 28i, and the carrier selection/target voltage selection unit 28j perform the same processing as the first motor control unit 18a, the second motor control unit 18b, the first motor gate generation unit 18c, the second motor gate generation unit 18d, the first motor target voltage calculation unit 18e, the second motor target voltage calculation unit 18f, the voltage control unit 18g, the current control unit 18h, the gate generation unit 18i, and the carrier selection/target voltage selection unit 18j of the first embodiment, thus description thereof will not be repeated. However, in the voltage control unit 28g, the VH sensor sampling timing request signal DS is output to the VH sensor sampling timing generator 28k.

In the VH sensor sampling timing generator 28k, a first carrier signal $SC_1$ from the first motor control unit 28a of the inverter control function and a second carrier signal $SC_2$ from the second motor control unit 28b are input, and a carrier selection signal SS is input from the carrier selection/target voltage selection unit 28j. In the VH sensor sampling timing generator 28k, the carrier signal of the motor having the target voltage not selected as the target voltage $VH_T$ of the two-motor system 2 from among the first carrier signal $SC_1$ and the second carrier signal $SC_2$ is selected as a carrier signal $SC_S$ for use in generating the VH sensor sampling timing TS on the basis of the carrier selection signal SS. The VH sensor sampling timing generator 28k outputs the timing of the crest or the timing of the trough of the carrier signal $SC_S$ immediately after the VH sensor sampling timing request signal DS to the AD converter 28m as the VH sensor sampling timing TS each time the VH sensor sampling timing request signal. DS is input from the voltage control unit 28g. The AD converter 28m AD converts the DC high voltage (analog value) VH detected by the VH sensor 13a each time the VH sensor sampling timing TS is input from the VH sensor sampling timing generator 28k and outputs the DC high voltage (digital value) VH after AD conversion to the VH sensor data update unit 28l.

The VH sensor data update unit 28l outputs the DC high voltage (digital value) VH to the voltage control unit 28g as a VH sensor value for use in the voltage boost control each time the DC high voltage (digital value) VH is input from the AD converter 28m.

Referring to FIG. 6, the reason that stable voltage boost control can be performed even when there is pulsation in the DC high voltage VH caused by the pulsation of the motor current due to the effect of switching on the inverter control side from the processing in the voltage boost control function described above will be described. The reason that pulsation occurs in the DC high voltage VH due to the pulsation of the motor current by the effect of switching in the inverter control has been described in the first embodiment, thus description thereof will not be repeated. An example shown in FIG. 6 is a case where the motor having the target voltage not selected as the target voltage $VH_T$ of the two-motor system 2 is the second motor 17.

As will be understood from the example shown in FIG. 6(d), when comparing the expected values $VH_{E1}$, $VH_{E2}$, and $VH_{E3}$ of the DC high voltage at the timing of the VH sensor sampling timing request signals $DS_1$, $DS_2$, and $DS_3$ with the DC high voltage $VH_{C4}$, $VH_{C5}$, and $VH_{C6}$ at the timing of the crest or trough of the carrier signal $SC_2$ of the second motor 17 immediately after the VH sensor sampling timing request signals $DS_1$, $DS_2$, and $DS_3$, the differences are very small. Accordingly, the DC high voltage VH (VH sensor value) at the timing of the crest or trough of the carrier signal $SC_2$ immediately after the VH sensor sampling timing request signal DS is acquired, whereby a value which is very close to the expected value $VH_E$ of the DC high voltage at the timing of the VH sensor sampling timing request signal DS can be obtained.

Accordingly, in the voltage boost control function of the motor ECU 28, the VH sensor sampling timing generator 28k generates the VH sensor sampling timing TS at the timing of the crest or trough of the carrier signal (the carrier signal of the motor having the target voltage not selected as the target voltage $VH_T$ of the two-motor system 2 significantly affecting the pulsation of the motor current) immediately after the request signal DS each time the VH sensor sampling timing request signal DS is input from the voltage control unit 28g, and the AD converter 28m AD converts the DC high voltage (analog value) VH detected by the VH sensor 13a for each VH sensor sampling timing TS to acquire the DC high voltage (digital value) VH. The voltage control unit 28g, performs the voltage boost control using the DC high voltage VH (VH sensor value) at the timing of the crest or trough of the carrier signal immediately after the VH sensor sampling timing request signal DS, whereby control can be performed using the DC high voltage VH (VH sensor value) close to the expected value $VH_E$ of the DC high voltage at the moment of the VH sensor sampling timing request signal DS.

According to the two-motor system 2 (in particular, the voltage boost control in the motor ECU 28), the same effects as the two-motor system 1 of the first embodiment are obtained. In particular, in the two-motor system 2 of the second embodiment, the carrier signal of the inverter control of the motor having the target voltage not selected as the target voltage $VH_T$ of the two-motor system 2 is selected, and the DC high voltage VH sampled at the timing of the crest or the timing of the trough of the carrier signal immediately after the VH sensor sampling timing request signal DS is used in the voltage boost control, whereby the voltage boost control can be performed using the sensor value of the DC high voltage VH close to the expected value $VH_E$ of the DC high voltage at the moment of the VH sensor sampling timing request signal DS, and stable voltage boost control, can be performed. In the two-motor system 2, since the AD converter 28m performs AD conversion only for each VH sensor sampling timing request signal DS, it is possible to reduce a processing load in the microcomputer of the motor ECU 28.

Although the embodiments of the invention have been described, the invention is not limited to the foregoing embodiments and may be carried out in various forms.

For example, although in this embodiment, the invention is applied to a two-motor system vehicle, the invention may be applied to various things, such as two-motor system device or mobile object. The invention may also be applied to a motor system including three or more motors. As a plurality of motors, motor generators or generator may be applied.

Although in this embodiment, the invention is applied to the voltage boost control for the voltage boost converter, the invention may be applied to voltage buck control for a voltage buck converter and voltage boost-buck control for a voltage boost-buck converter.

Although in this embodiment, two setting methods using the carrier signal of the inverter control for the timing of sampling of the DC high voltage for use in the voltage boost control have been described, other setting methods using the carrier signal of the inverter control may be used. Instead of the carrier signal, gate signals (for example, a PWM signal) of the inverter control to be generated from the carrier signal may be used.

Although in this embodiment, a configuration has been made in which a higher voltage from among the target voltages of the two motors is selected as the target voltage of the system, and the sampling timing is set using the carrier signal of the motor having the target voltage not selected as the target voltage, in a case of a system including three or more motors, the target voltage of the system may be selected from among the target voltages of the three or more motors, the carrier signal of the motor which affects the pulsation of the motor current the most may be selected from among the carrier signals of a plurality of motors having the target voltages not selected as the target voltage, and the sampling timing may be set using the selected carrier signal.

INDUSTRIAL APPLICABILITY

According to the invention, in a voltage conversion control device for a motor which performs voltage conversion control on a voltage conversion circuit between a motor control circuit controlling a plurality of motors and a power supply configured to convert a DC voltage of the power supply to an input DC voltage necessary for driving the motor, the input DC voltage for use in the voltage conversion control is sampled taking into consideration the carrier signal of the motor having the target voltage not selected as the target voltage of the input DC voltage to be converted by the voltage conversion circuit, whereby stable voltage conversion control can be performed even when there is pulsation in the input DC voltage of the motor.

REFERENCE SIGNS LIST 1, 2: two-motor system, 10: battery, 11: filter capacitor, 12: voltage boost converter, 12a: reactor, 12b, 12c: switching element, 12d, 12e: reflux diode, 12f: IL sensor, 13: smoothing capacitor, 13a: VH sensor, 14: first inverter, 15: second inverter, 16: first motor, 17: second motor, 18, 28: motor ECU, 18a, 28a: first motor control unit, 18b, 28b: second motor control unit, 18c, 28c: first gate generation unit, 18d, 28d: second gate generation unit, 18e, 28e: first motor target voltage calculation unit, 18f, 28f: second motor target voltage calculation unit, 18g, 28g: voltage control unit, 18h, 28h:

current control unit, 18*i*, 28*i*: gate generation unit, 18*j*, 28*j*: carrier selection/target voltage selection unit, 18*k*, 28*k*: VH sensor sampling timing generator, 18*l*, 28*l*: VH sensor data update unit, 18*m*, 18*n*, 28*m*, 28*n*: AD converter, 19: traveling control ECU.

The invention claimed is:

1. A voltage conversion control device for a motor which performs voltage conversion control on a voltage conversion circuit provided between a motor control circuit controlling a plurality of motors and a power supply, the voltage conversion circuit configured to convert a DC voltage of the power supply to an input DC voltage necessary for driving the motor, the voltage conversion control device comprising:

sampling unit that detects a voltage across both ends of a capacitor provided between the motor control circuit and the voltage conversion circuit and sampling the input DC voltage converted by the voltage conversion circuit;

target voltage setting unit that sets a target voltage of the input DC voltage for each motor;

selection unit that selects a target voltage to be converted by the voltage conversion circuit from among a plurality of target voltages set by the target voltage setting unit;

sampling timing generation unit that generates a sampling timing of sampling the input DC voltage converted by the voltage conversion circuit on the basis of a carrier signal of motor control on one of the motors having the target voltages not selected by the selection unit; and control unit that performs voltage conversion control using the input DC voltage sampled by the sampling unit in accordance with the sampling timing generated by the sampling timing generation unit for each sampling timing request of the voltage conversion control.

2. The voltage conversion control device for a motor according to claim 1,
wherein the sampling timing generation unit generates a sampling timing in response to a crest and a trough of the carrier signal, each time the sampling timing is generated, the input DC voltage converted by the voltage conversion circuit is sampled by the sampling unit, and for each sampling timing request, the control unit performs the voltage conversion control using the input DC voltage sampled in accordance with the sampling timing immediately before the sampling timing request.

3. The voltage conversion control device for a motor according to claim 1,
wherein, for each sampling timing request, the sampling timing generation unit generates a sampling timing in response to a crest or a trough of the carrier signal immediately after the sampling timing request, the sampling unit samples an input DC voltage converted by the voltage conversion circuit in response to the sampling timing, and the control unit performs voltage conversion control using the input DC voltage sampled in response to the sampling timing for each sampling timing request.

4. The voltage conversion control device for a motor according to claim 1,
wherein the plurality of motors are two motors,
the target voltage setting unit sets the target voltages of the two motors,
the selection unit selects a target voltage to be converted by the voltage conversion circuit from among the target voltages of the two motors set by the target voltage setting unit, and
the sampling timing generation unit generates a sampling timing for sampling an input DC voltage converted by the voltage conversion circuit on the basis of a carrier signal of the motor having the target voltage not selected by the selection unit.

* * * * *